US012789364B2

(12) United States Patent
Yoneyama

(10) Patent No.: US 12,789,364 B2
(45) Date of Patent: Nov. 10, 2026

(54) ROBOT SIMULATION DEVICE

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 141 days.

(21) Appl. No.: 18/548,100

(22) PCT Filed: May 25, 2021

(86) PCT No.: PCT/JP2021/019843
§ 371 (c)(1),
(2) Date: Aug. 28, 2023

(87) PCT Pub. No.: WO2022/249295
PCT Pub. Date: Dec. 1, 2022

(65) Prior Publication Data
US 2024/0123611 A1 Apr. 18, 2024

(51) Int. Cl.
*B25J 9/16* (2006.01)

(52) U.S. Cl.
CPC .................................. *B25J 9/1605* (2013.01)

(58) Field of Classification Search
CPC ...... B25J 9/1605; B25J 9/1697; B25J 9/1671; G05B 2219/40323; G05B 2219/40515; G05B 19/41885; G05B 2219/39451
See application file for complete search history.

(56) References Cited

U.S. PATENT DOCUMENTS

2007/0282485 A1* 12/2007 Nagatsuka ......... G05B 19/4069 700/245
2015/0261899 A1* 9/2015 Atohira .................. B25J 9/1671 703/7

FOREIGN PATENT DOCUMENTS

| | | | |
|---|---|---|---|
| CN | 101034418 | A | 9/2007 |
| EP | 1832947 | A2 | 9/2007 |
| JP | 2005-103681 | A | 4/2005 |
| JP | 2011044046 | A * | 3/2011 |
| JP | 2015-171745 | A | 10/2015 |
| JP | 2018-144158 | A | 9/2018 |
| JP | 2018-144166 | A | 9/2018 |
| JP | 2020-097061 | A | 6/2020 |

* cited by examiner

*Primary Examiner* — Bao Long T Nguyen
(74) *Attorney, Agent, or Firm* — HAUPTMAN HAM, LLP

(57) ABSTRACT

A robot simulation device includes: an arrangement unit that arranges a robot model, a visual sensor model, and a workpiece model in a virtual space; a calculation unit that, by superimposing three-dimensional position information for a workpiece, acquired by a visual sensor in a workspace and based on a robot or the visual sensor, and shape characteristics of a workpiece model, calculates a position and orientation of the workpiece model based on a robot model or a visual sensor model in the virtual space; and a simulation unit that measures the workpiece model using the visual sensor model and executes a simulation operation in which work is performed on the workpiece model by the robot model. The arrangement unit arranges, in the virtual space, the workpiece model in the position and the orientation calculated by the calculation unit and based on the robot model or the visual sensor model.

5 Claims, 11 Drawing Sheets

ROBOT SIMULATION DEVICE

RELATED APPLICATIONS

The present application is a National Phase of International Application No. PCT/JP2021/019843 filed May 25, 2021.

FIELD

The present invention relates to a robot simulation device.

BACKGROUND

In a robot system including a robot, a visual sensor, and a workpiece in a workspace, a technique for executing a simulation in which a robot model of the robot, a visual sensor model of the visual sensor, and a workpiece model of the workpiece are arranged in a virtual space that three-dimensionally expresses the workspace, the workpiece model is measured by the visual sensor model, and the robot model performs work on the workpiece model has been known (for example, PTL 1).

PTL 2 describes an "information processing device including: a first selection unit that selects, based on a first instruction input, one coordinate system from a plurality of coordinate systems included in a virtual space in which a first model based on CAD data including position information in the virtual space is arranged; a first acquisition unit that acquires first information indicating a second model not including the position information in the virtual space; a second acquisition unit that acquires second information indicating a position in the coordinate system selected by the first selection unit; and a setting unit that sets, to the position, a position of the second model in the virtual space, based on the first and second information" (Abstract).

CITATION LIST

Patent Literature

[PTL 1] Japanese Unexamined Patent Publication (Kokai) No. 2015-171745 A

[PTL 2] Japanese Unexamined Patent Publication (Kokai) No. 2020-97061 A

SUMMARY

Technical Problem

A simulation device as described in PTL 1 generates a state of workpiece models loaded in bulk in a virtual space by using, for example, a random number. A simulation technique that can efficiently create an operation program of a robot that can achieve a more accurate workpiece picking-up operation is desired.

Solution to Problem

One aspect of the present disclosure is a robot simulation device for simulating work performed on a workpiece by a robot in a robot system including the robot, a visual sensor, and the workpiece arranged in a workspace, and the robot simulation device includes: a model arrangement unit configured to arrange a robot model of the robot, a visual sensor model of the visual sensor, and a workpiece model of the workpiece in a virtual space that three-dimensionally expresses the workspace; a workpiece model position calculation unit configured to calculate a position and a posture of the workpiece model with reference to the robot model or the visual sensor model in the virtual space by superimposing a shape feature of the workpiece model on three-dimensional position information about the workpiece with reference to the robot or the visual sensor being acquired by the visual sensor in the workspace; and a simulation execution unit configured to execute a simulation operation in which the workpiece model is measured by the visual sensor model, and work is performed on the workpiece model by the robot model, wherein the model arrangement unit arranges the workpiece model in the virtual space in the position and the posture with reference to the robot model or the visual sensor model being calculated by the workpiece model position calculation unit.

Advantageous Effects of Invention

A simulation operation of work of a robot model is executed while a state of workpieces loaded in bulk in a workspace is reproduced in a virtual space, and thus an operation program that can execute a more accurate picking-up operation can be efficiently created.

The objects, the features, and the advantages, and other objects, features, and advantages of the present invention will become more apparent from the detailed description of typical embodiments of the present invention illustrated in accompanying drawings.

DESCRIPTION OF EMBODIMENTS

Figure 1:
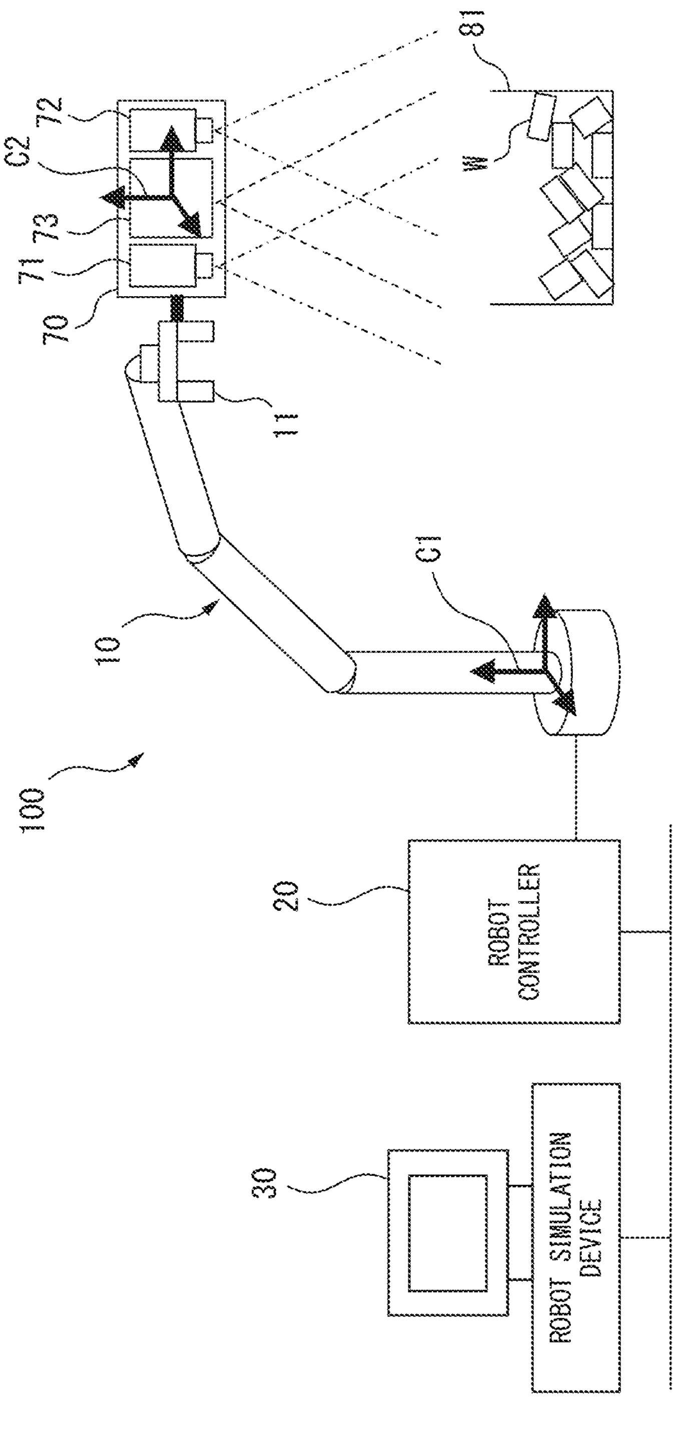
FIG. 1 is a diagram illustrating a configuration in which a robot simulation device according to one embodiment is connected to a robot system.

Next, embodiments of the present disclosure will be described with reference to drawings. A similar configuration portion or a similar functional portion is denoted by the same reference sign in the referred drawings. A scale is appropriately changed in the drawings in order to facilitate understanding. An aspect illustrated in the drawing is one example for implementing the present invention, and the present invention is not limited to the illustrated aspect.

FIG. 1 is a diagram illustrating a configuration in which a robot simulation device 30 according to one embodiment is connected to a robot system 100. The robot system 100 includes a robot 10, a robot controller 20 that controls an operation of the robot 10, a visual sensor 70, and a workpiece W placed in a state of being loaded in bulk in a container 81. A hand 11 is mounted on a wrist flange portion of the robot 10. Each object constituting the robot system 100 is arranged in a workspace. The robot simulation device 30 is a device for executing a simulation for creating an operation program of the robot 10. The robot simulation device 30 is connected to the robot controller 20 in a wired or wireless manner. Note that the robot simulation device 30 may be remotely connected to the robot controller 20.

The robot simulation device 30 according to the present embodiment arranges, in a virtual space, a model of each object including the robot 10, the visual sensor 70, and the workpieces W loaded in bulk in the container 81, and simulates, by operating the models in a simulated manner, an operation of detecting the workpiece W by the visual sensor 70 and picking up the workpiece W by the robot 10 (hand 11). In this case, the robot simulation device 30 executes the simulation by acquiring actual three-dimensional position information about the workpiece W loaded in bulk in the container 81, and reproducing an actual state of the workpiece W loaded in bulk in the virtual space, and can thus efficiently create an operation program that can execute a more accurate workpiece picking-up operation.

The visual sensor 70 may be a two-dimensional camera that acquires a two-dimensional image, or may be a three-dimensional position detector that acquires a three-dimensional position of a target object. In the present embodiment, the visual sensor 70 is assumed to be a range sensor that can acquire a three-dimensional position of a target object. The visual sensor 70 includes a projector 73, and two cameras 71 and 72 arranged in positions facing each other across the projector 73. The projector 73 is configured to be able to project desired pattern light such as spotlight or slit light on a surface of a target object. The projector includes a light source such as a laser diode or a light-emitting diode, for example. The cameras 71 and 72 are a digital camera including an image pick-up device such as a CCD and a CMOS sensor.

Note that FIG. 1 also illustrates a robot coordinate system C1 set in the robot 10, and a sensor coordinate system C2 set in the visual sensor 70. As one example, the robot coordinate system C1 is set in a base portion of the robot 10, and the sensor coordinate system C2 is set in a position of a lens of the visual sensor 70. A position and a posture in the coordinate systems are recognized in the robot controller 20. As an exemplification, FIG. 1 illustrates a configuration in which the visual sensor 70 is attached to an arm tip portion of the robot 10, but a configuration example in which the visual sensor 70 is fixed to a known position in the workspace is also possible.

Figure 2:
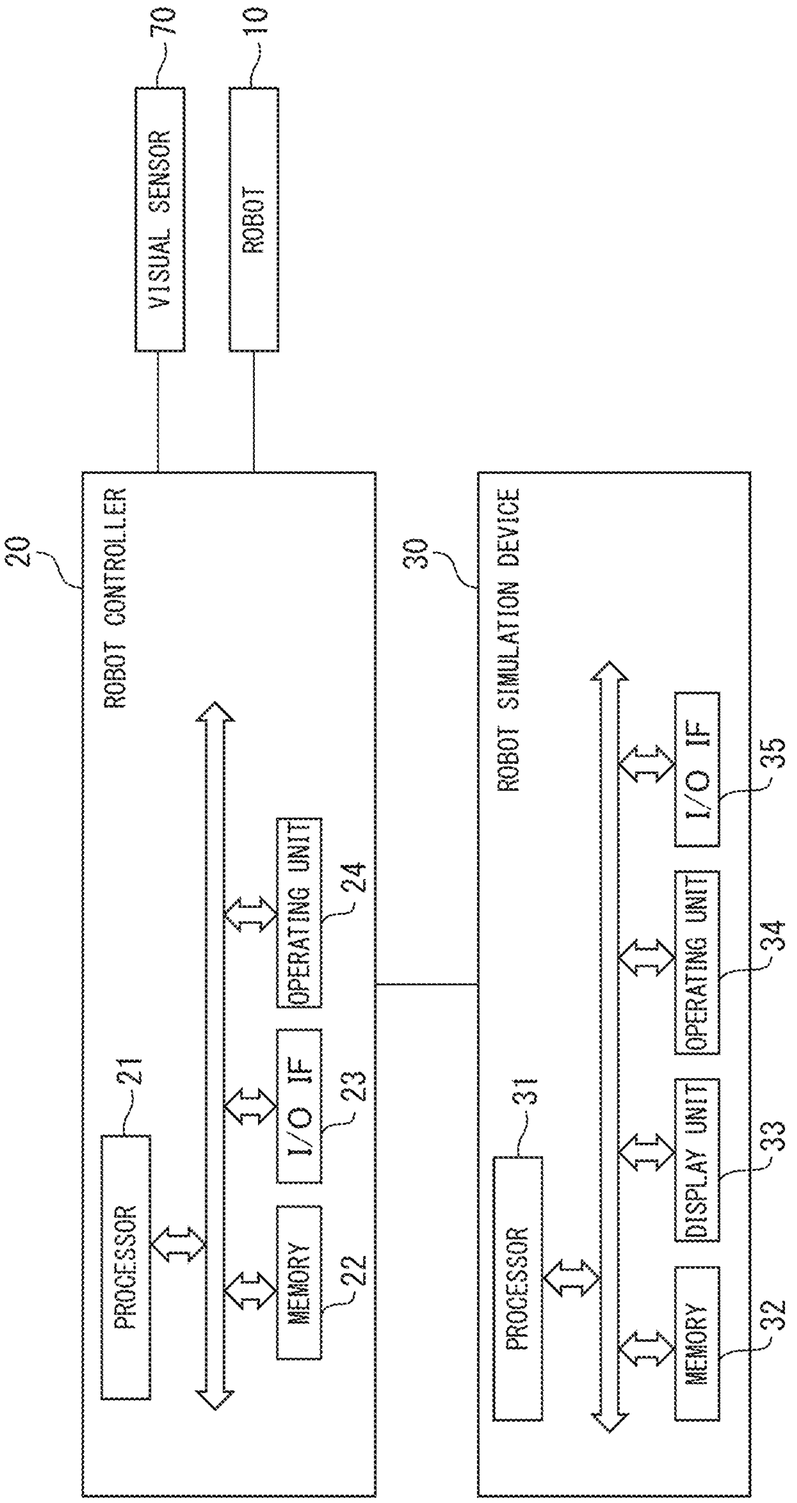
FIG. 2 is a diagram illustrating a hardware configuration example of a robot controller and the robot simulation device.

FIG. 2 is a diagram illustrating a hardware configuration example of the robot controller 20 and the robot simulation device 30. The robot controller 20 may have a configuration as a general computer in which a memory 22 (such as a ROM, a RAM, and a non-volatile memory), an input/output interface 23, an operating unit 24 including various operation switches, and the like are connected to a processor 21 via a bus. The robot simulation device 30 may have a configuration as a general computer in which a memory 32 (such as a ROM, a RAM, and a non-volatile memory), a display unit 33, an operating unit 34 formed of an input device such as a keyboard (or a software key), an input/output interface 35, and the like are connected to a processor 31 via a bus. Various information processing devices such as a personal computer, a notebook PC, and a tablet terminal can be used as the robot simulation device 30.

Figure 3:
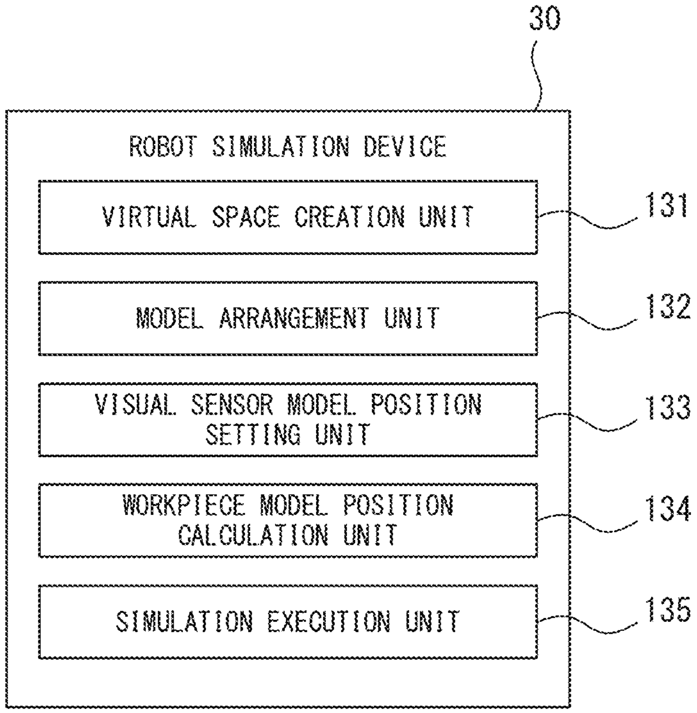
FIG. 3 is a functional block diagram illustrating a functional configuration of the robot simulation device.

FIG. 3 is a functional block diagram illustrating a functional configuration of the robot simulation device 30. The robot simulation device 30 includes a virtual space creation unit 131, a model arrangement unit 132, a visual sensor model position setting unit 133, a workpiece model position calculation unit 134, and a simulation execution unit 135.

The virtual space creation unit 131 creates a virtual space that three-dimensionally expresses a workspace.

The model arrangement unit 132 arranges a model of each object constituting the robot system 100 in the virtual space. A state where each object model is arranged in the virtual space by the model arrangement unit 132 may be displayed on the display unit 33.

The visual sensor model position setting unit 133 acquires information indicating a position of the visual sensor 70 in the workspace from the robot controller 20. For example, the visual sensor model position setting unit 133 acquires, as a file from the robot controller 20, information (calibration data) being stored in the robot controller 20 and indicating a relative position between the robot coordinate system C1 and the sensor coordinate system C2. Specifically, the information indicating this relative position is a position and a posture of the visual sensor 70 (sensor coordinate system C2) with reference to the robot 10 (robot coordinate system C1) in the workspace. The information indicating the relative position between the robot coordinate system C1 and the sensor coordinate system C2 is acquired by performing calibration of the visual sensor 70 in advance in the robot system 100, and is stored in the robot controller 20.

Herein, the calibration is achieved by, for example, acquiring a position and a posture of the visual sensor 70 with respect to a visual marker attached to a predetermined reference position of a robot by measuring the visual marker by the visual sensor 70. The position and the posture of the visual sensor 70 with respect to the robot 10 are acquired by acquiring the position and the posture of the visual sensor 70 with respect to a visual marker arranged in a known position.

The model arrangement unit 132 arranges the visual sensor model in the virtual space in such a way that a relative position between a robot model coordinate system set in the robot model in the virtual space and a sensor model coordinate system set in the visual sensor model is the same as the relative position between the robot coordinate system and the sensor coordinate system in the workspace.

The workpiece model position calculation unit 134 calculates a position and a posture of the workpiece model with reference to the robot model or the visual sensor model in the virtual space by superimposing a shape feature of the workpiece model on three-dimensional position information about a workpiece with reference to the robot 10 or the visual sensor 70 being acquired by the visual sensor 70 in the workspace. The model arrangement unit 132 arranges the workpiece model in the calculated position and posture in the virtual space.

The simulation execution unit 135 executes a simulation of an operation of measuring, by the visual sensor model, the workpiece model arranged in a state of being loaded in bulk in the calculated position and posture, and picking up the workpiece model by the robot model. Note that, when a simulation or a simulation operation is referred in this specification, a case where each object model such as the robot model is operated in a simulated manner on a display screen is included in addition to a case where a numerical simulation of an operation of a robot and the like is executed.

Figure 4:
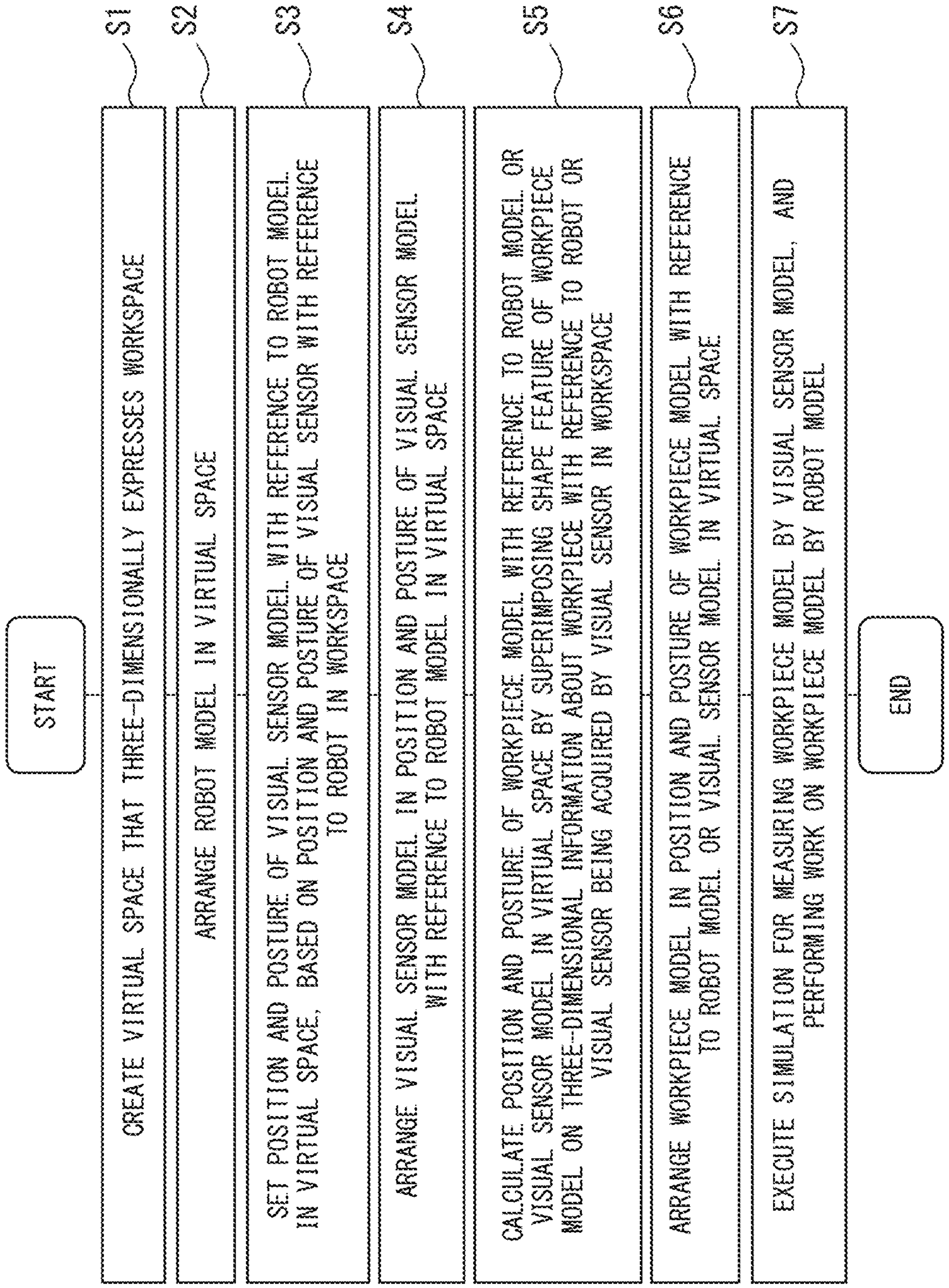
FIG. 4 is a flowchart illustrating a simulation operation by the robot simulation device.

FIG. 4 is a flowchart illustrating a simulation operation executed under control by the processor 31 of the robot simulation device 30.

Figure 5:
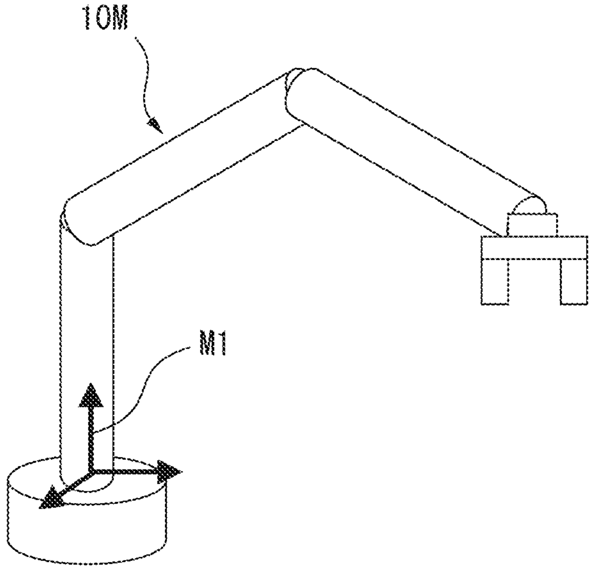
FIG. 5 is a diagram illustrating a state where a robot model is arranged in a virtual space.

First, the virtual space creation unit 131 creates a virtual space that three-dimensionally expresses a workspace (step S1). Then, the model arrangement unit 132 arranges a robot model 10M in the virtual space (step S2). FIG. 5 illustrates a state where the robot model 10M is arranged in the virtual space. Further, the simulation execution unit 135 sets, in the virtual space, a robot model coordinate system M1 for the robot model 10M in a position associated with the robot coordinate system C1 defined in the workspace.

Next, the visual sensor model position setting unit 133 sets a position and a posture of a visual sensor model 70M with reference to the robot model 10M in the virtual space, based on a position and a posture of the visual sensor 70 with reference to the robot 10 in the workspace (step S3). For example, the position and the posture of the visual sensor with reference to the robot 10 in the workspace are stored in the robot controller 20 as a relative position between the robot coordinate system C1 and the sensor coordinate system C2 by performing calibration of the visual sensor 70 in the robot system 100. In step S3, the visual sensor model position setting unit 133 acquires, from the robot controller 20, information as the relative position between the robot coordinate system C1 and the sensor coordinate system C2.

Next, in step S4, the model arrangement unit 132 arranges the visual sensor model 70M in the virtual space in such a way that a relative position between the robot model coordinate system M1 and a sensor model coordinate system M2 is equal to the relative position between the robot coordinate system C1 and the sensor coordinate system C2 in the workspace.

Figure 6:
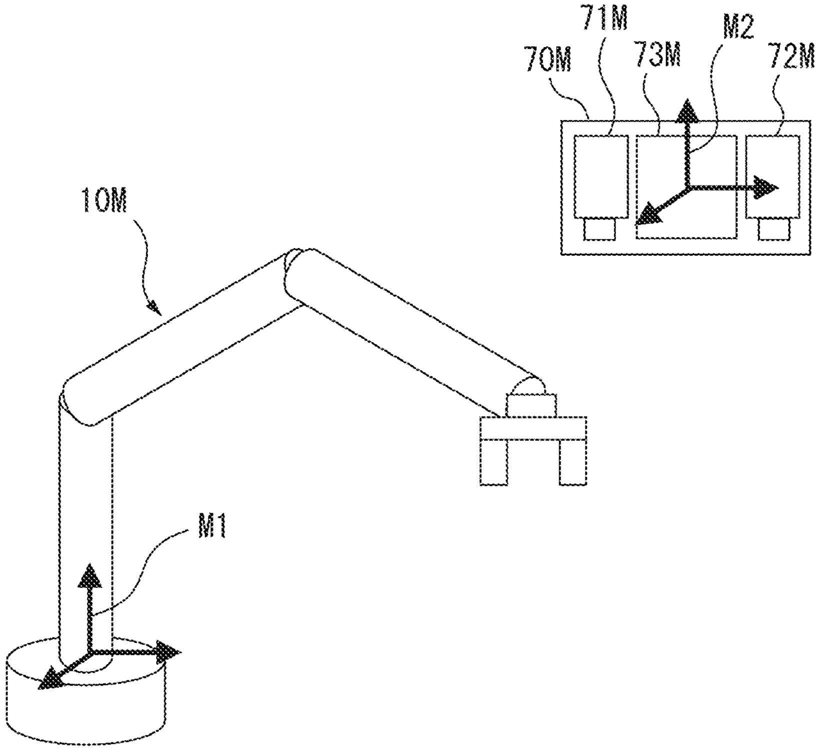
FIG. 6 is a diagram illustrating a state where the robot model and a visual sensor model are arranged in the virtual space when the visual sensor model is a fixed sensor being fixed in the virtual space.
Figure 7:
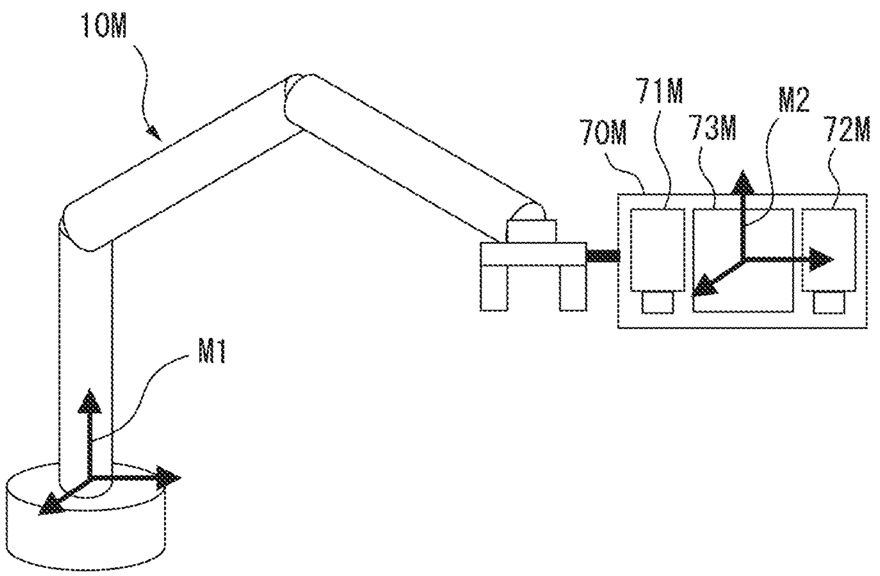
FIG. 7 is a diagram illustrating a state where the robot model and the visual sensor model are arranged in the virtual space when the visual sensor model is mounted on the robot model.

FIGS. 6 and 7 illustrate a state where the model arrangement unit 132 arranges the visual sensor model 70M in the virtual space according to the information indicating a relative position of the visual sensor 70 with respect to the robot 10. Note that FIG. 6 illustrates an example when the visual sensor 70 is used as a fixed camera being fixed to a predetermined position in the workspace, and FIG. 7 illustrates an example when the visual sensor 70 is attached to the arm tip portion of the robot 10. As illustrated in FIGS. 6 and 7, the visual sensor model 70M includes a projector model 73M, and two camera models 71M and 72M arranged in such a way as to face each other across the projector model 73M. As illustrated in FIGS. 6 and 7, in the virtual space, the sensor model coordinate system M2 is set in a position associated with the sensor coordinate system C2.

Next, in step S5, the workpiece model position calculation unit 134 calculates a position and a posture of a workpiece model WM with reference to the robot model 10M or the visual sensor model 70M in the virtual space by superimposing a shape feature of the workpiece model WM on three-dimensional information about the workpiece W with reference to the robot 10 or the visual sensor 70 being acquired by the visual sensor 70 in the workspace.

Three-dimensional position information about the workpiece W is stored as, for example, a set of three-dimensional coordinates with reference to the robot coordinate system C1 or the sensor coordinate system C2 in the robot controller 20 by measuring the workpiece W by the visual sensor 70. The workpiece model position calculation unit 134 acquires the three-dimensional position information about the workpiece W from the robot controller 20, and calculates the position and the posture of the workpiece model WM by superimposition of the shape feature of the workpiece model WM.

Figure 8:
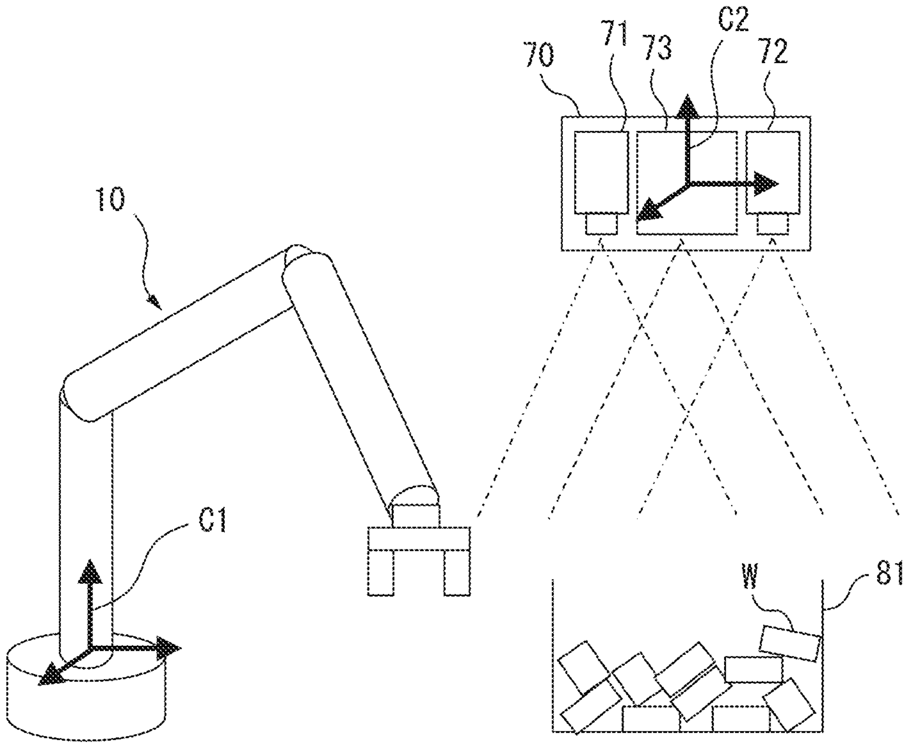
FIG. 8 is a diagram illustrating a situation where a visual sensor measures a workpiece when the visual sensor is a fixed sensor being fixed in a workspace.
Figure 9:
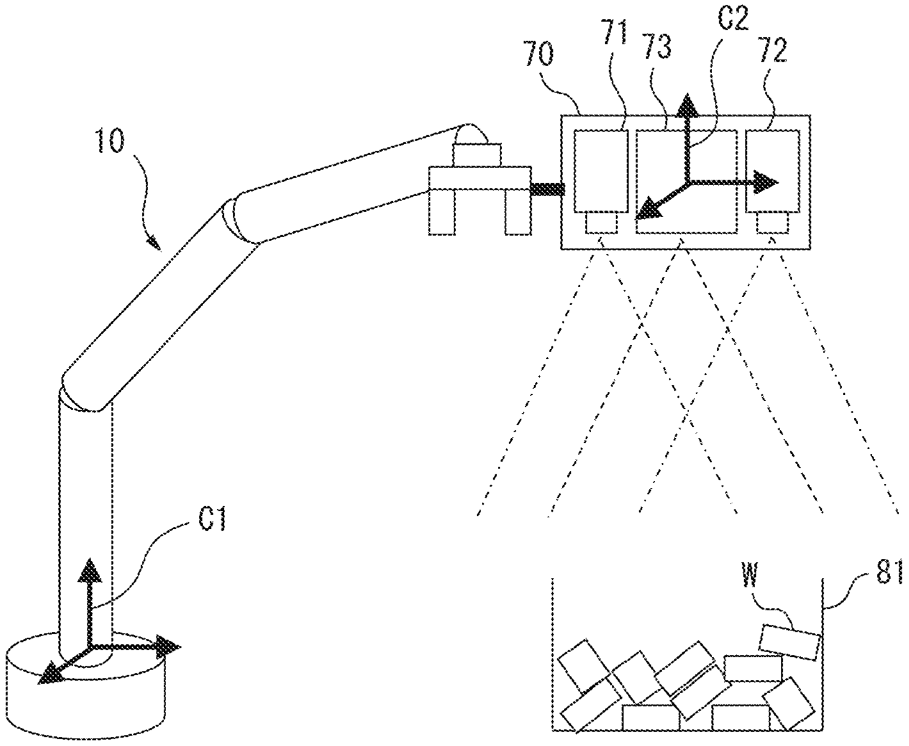
FIG. 9 is a diagram illustrating a situation where the workpiece is measured by the visual sensor when the visual sensor is mounted on a robot.

Herein, a method for acquiring, by the visual sensor 70, the three-dimensional position information about the workpiece W in a state of being loaded in bulk will be described with reference to FIGS. 8 to 10. In the present embodiment, the visual sensor 70 is a range sensor that can acquire a distance to a target object. The range sensor acquires three-dimensional information about a workpiece in a form such as a distance image or a three-dimensional map, for example. The distance image is an image that expresses a distance from the range sensor to the workpiece within a measurement distance by light and darkness or a color of each pixel. The three-dimensional map expresses a three-dimensional position of the workpiece in a measurement region as a set of three-dimensional coordinate values of points on a surface of the workpiece.

The two cameras 71 and 72 of the visual sensor 70 face in directions different from each other in such a way that visual fields of the two cameras 71 and 72 at least partially overlap each other. The projector 73 is arranged in such a way that a projection range of the projector 73 at least partially overlaps the visual field of each of the cameras 71 and 72. FIG. 8 is a diagram illustrating a situation where the workpiece W is measured by the visual sensor 70 when the visual sensor 70 is a fixed camera being fixed to a predetermined position in the workspace. FIG. 9 is a diagram illustrating a situation where the workpiece W is measured by the visual sensor 70 when the visual sensor 70 is mounted on the arm tip portion of the robot 10.

Figure 10:
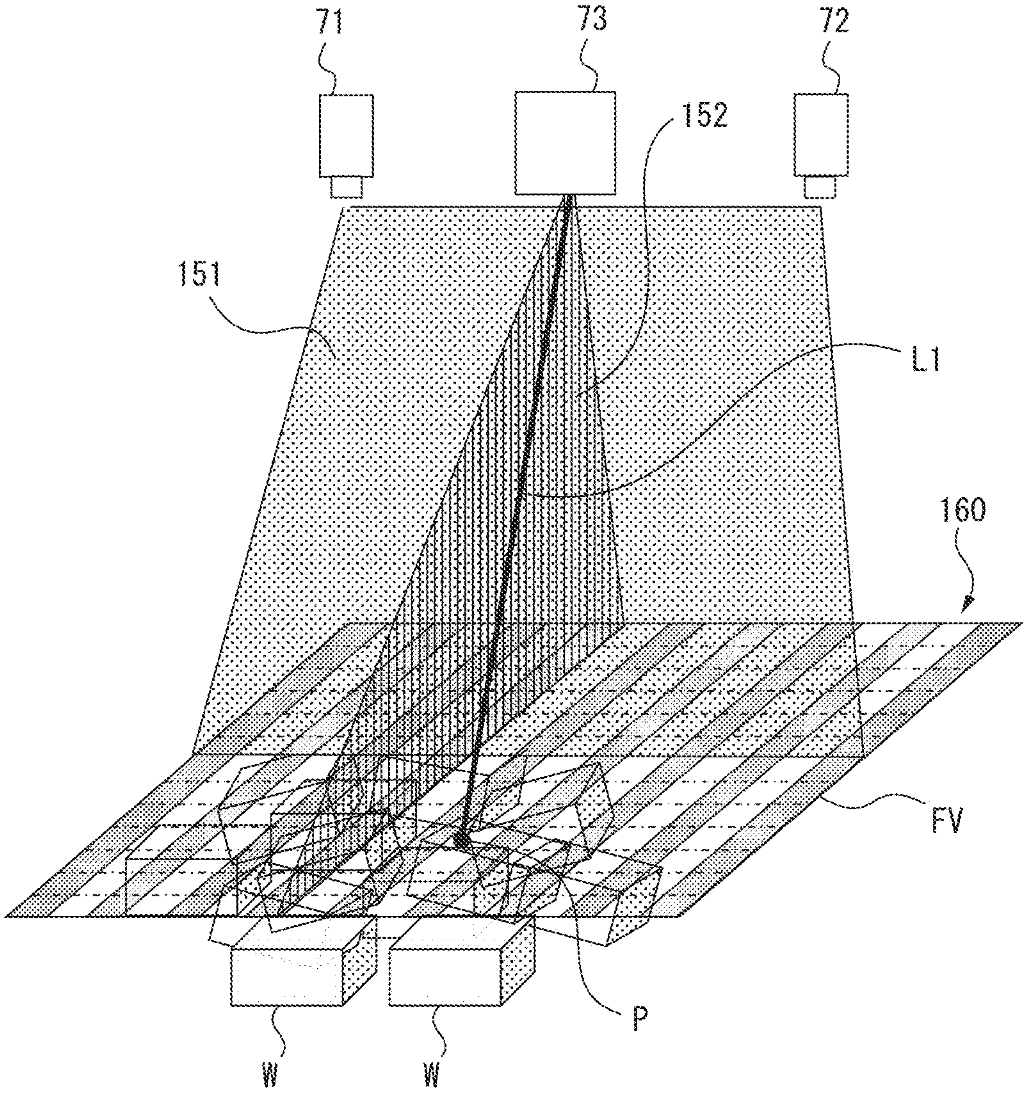
FIG. 10 is a diagram illustrating a situation where measurement of the workpiece is performed by projecting pattern light on the workpiece by the visual sensor.

A plurality of intersection lines of a first plane group arranged to divide, at a regular interval, the visual field in which the two cameras 71 and 72 capture a range which is a target of measurement in a region provided with the workpiece W and which passes through focuses of the two cameras 71 and 72, and a second plane group corresponding to a boundary surface of light and darkness of striped pattern light 160 when the projector 73 projects the pattern light 160 on the range being the target of measurement in the region provided with the workpiece W are calculated, and the three-dimensional position information about the workpiece W is calculated as three-dimensional coordinates of an intersection point of the intersection line and a workpiece surface (see FIG. 10).

FIG. 10 illustrates, as a visual field FV, the visual field (the range being the measurement target) captured by the two cameras 71 and 72, and illustrates, by a dot-and-dash line, a virtual line dividing the visual field at a regular interval. FIG.

10 illustrates the striped pattern light 160 projected on the region provided with the workpiece W, one (hereinafter described as a first plane 151) of the first plane group, and one (hereinafter a second plane 152) of the second plane group. Note that FIG. 10 illustrates the striped pattern light 160 as a light and darkness pattern (expressed by presence or absence of hatching) extending from a back side to a front side in FIG. 10. Further, FIG. 10 illustrates an intersection line L1 of the first plane 151 and the second plane 152, and an intersection point P of the intersection line L1 and a surface of the workpiece W.

In this way, the first plane group and the second plane group are calculated, and the intersection line of the first plane group and the second plane group is also calculated. Then, three-dimensional information about a plurality of the intersection points P of a plurality of the calculated intersection lines and the surface of the workpiece W loaded in bulk is calculated.

The robot controller 20 acquires three-dimensional coordinates for all of the workpieces W by performing a workpiece picking-up process for a plurality of times.

The three-dimensional coordinates for all of the workpieces W acquired in the robot system 100 according to the procedure as described above are stored in the robot controller 20.

The workpiece model position calculation unit 134 acquires, as the three-dimensional information about the workpiece W from the robot controller 20, the three-dimensional coordinates (coordinates with reference to the robot coordinate system C1 or the sensor coordinate system C2) of the plurality of intersection points P on the workpiece surface acquired as described above. Then, the workpiece model position calculation unit 134 searches for a position and a posture that may be taken by the workpiece model by comparing the three-dimensional information about the workpiece W with the shape feature of the workpiece model (such as surface data, ridge line data, and vertex data about the workpiece model), and calculates a position and a posture of the workpiece model having a maximum degree of coincidence between the set of three-dimensional coordinates and shape information about the workpiece model. In this way, the workpiece model position calculation unit 134 acquires the position and the posture of the workpiece model WM in the virtual space associated with a position and a posture of the workpiece W in the workspace.

Figure 11:
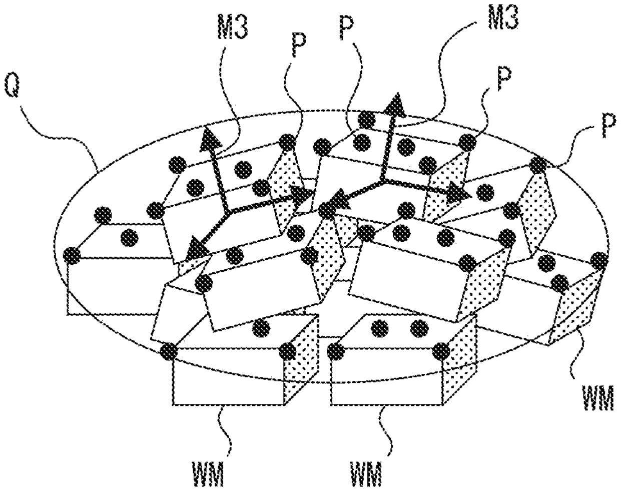
FIG. 11 is a diagram illustrating a situation where a plurality of intersection points are measured on a workpiece surface.

FIG. 11 illustrates a state where the workpiece model WM is superimposed and arranged on the three-dimensional position information (the plurality of intersection points P) about the workpiece W by such a procedure. Note that FIG. 11 illustrates a range Q in which a three-dimensional position of the workpiece W is acquired. Further, FIG. 11 also illustrates a workpiece model coordinate system M3 being set in each workpiece model WM. For example, when each workpiece model WM has a rectangular parallelepiped shape, the workpiece model coordinate system M3 may be set in a centroid position of the rectangular parallelepiped shape.

Figure 12:
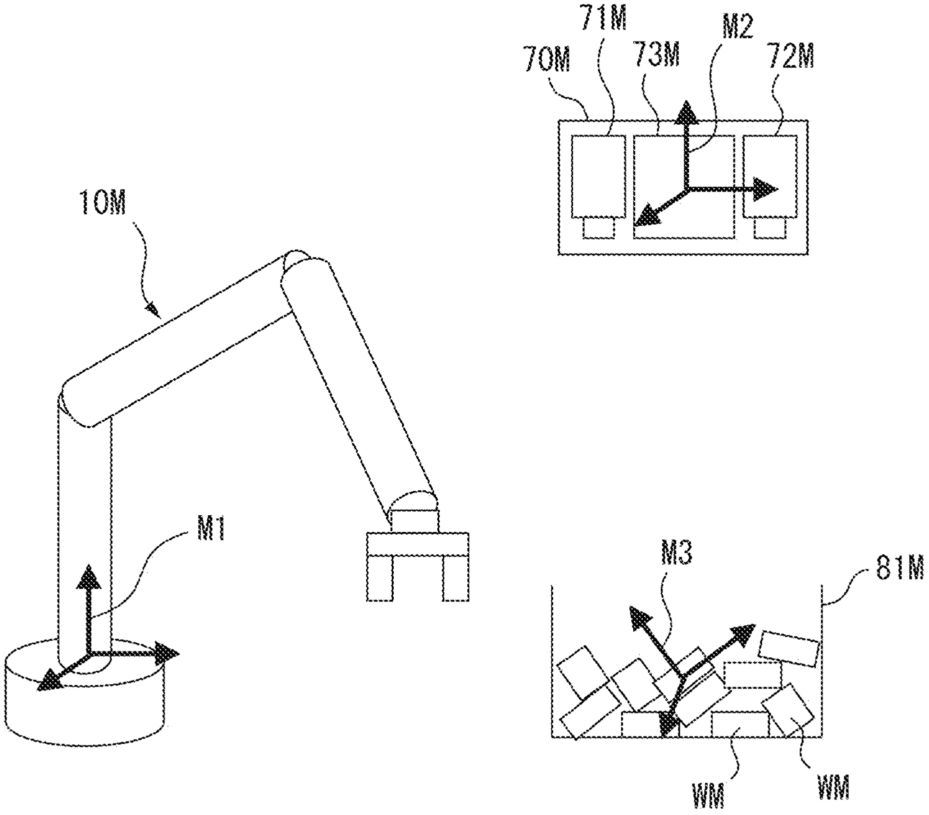
FIG. 12 illustrates a state where a workpiece model is arranged in the virtual space, based on calculated position and posture of the workpiece model, when the visual sensor model is the fixed sensor being fixed in the virtual space.
Figure 13:
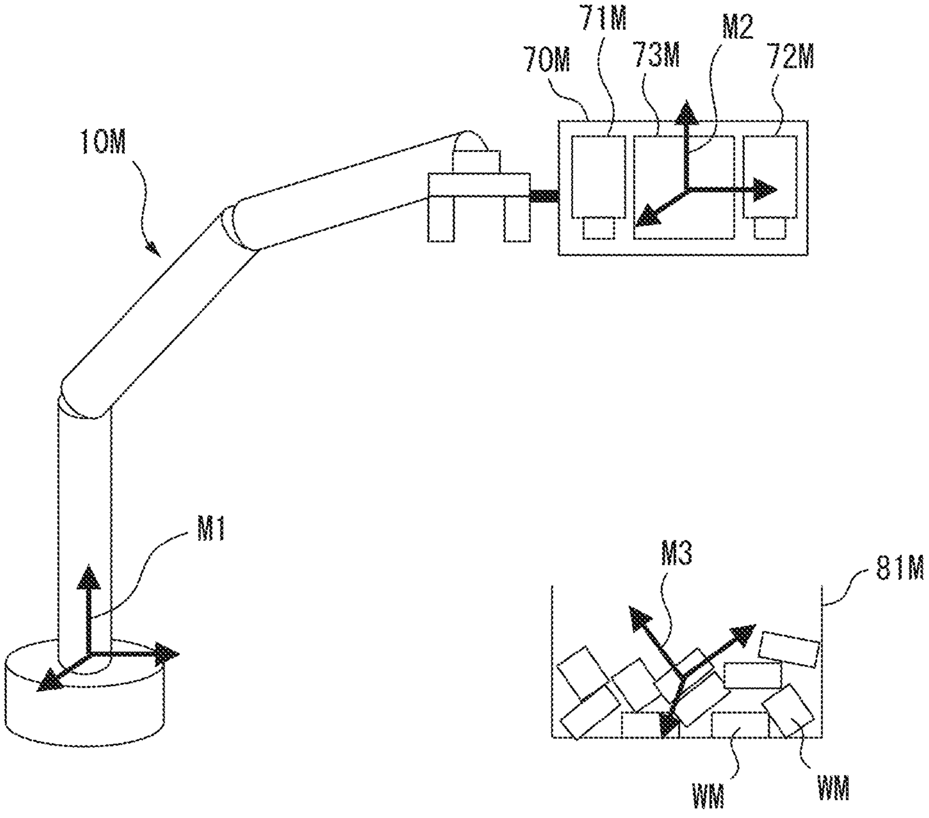
FIG. 13 illustrates a state where a workpiece model WM is arranged in the virtual space, based on calculated position and posture of the workpiece model, when the visual sensor model is mounted on the robot model.

Next, in step S6, the model arrangement unit 132 arranges the workpiece model WM in the position and the posture of the workpiece model WM with reference to the robot model 10M or the visual sensor model 70M in the virtual space. FIG. 12 illustrates a state where the workpiece model WM is arranged in the virtual space, based on the position and the posture of the workpiece model WM calculated in step S5, when the visual sensor model 70M is a fixed sensor having a fixed position. FIG. 13 illustrates a state where the workpiece model WM is arranged in the virtual space, based on the position and the posture of the workpiece model WM calculated in step S5, when the visual sensor model 70M is mounted on the robot model 10M. As illustrated in FIGS. 12 and 13, the position and the posture of the workpiece model WM may be acquired as a position and a posture of the workpiece model coordinate system M3 with respect to the robot model coordinate system M1 or the visual sensor model coordinate system M2. In this way, an actual arrangement of the workpiece W loaded in bulk in the workspace is reproduced in the virtual space.

Next, in step S7, in a state where the workpiece model WM is arranged in the virtual space as in FIG. 12 or 13, the simulation execution unit 135 executes a simulation of work for measuring the workpiece model WM by the visual sensor model 70M, and picking up the workpiece model WM one by one by a hand model 11M mounted on the robot model 10M.

Similarly to a measurement operation using the visual sensor 70, the simulation execution unit 135 measures a position and a posture of the workpiece model WM in the virtual space in a simulated manner by the following procedures.

(a1) A first plane group is calculated based on a position and a measurement region of the two camera models 71M and 72M in the visual sensor model 70M arranged in the virtual space.

(a2) Next, a second plane group is calculated based on a position and a measurement region of the projector model 73M.

(a3) A plurality of intersection lines of the first plane group and the second plane group are calculated.

(a4) Three-dimensional coordinates of an intersection point of the intersection line and the workpiece model WM are calculated.

(a5) The position and the posture of the workpiece model WM are calculated based on the three-dimensional coordinates of the workpiece model WM.

(a6) An operation of moving the robot model 10M to a position in which a target workpiece model can be held, based on the calculated position and posture of the workpiece model WM, and picking up the target workpiece model by the hand model 11M is simulated.

Figure 14:
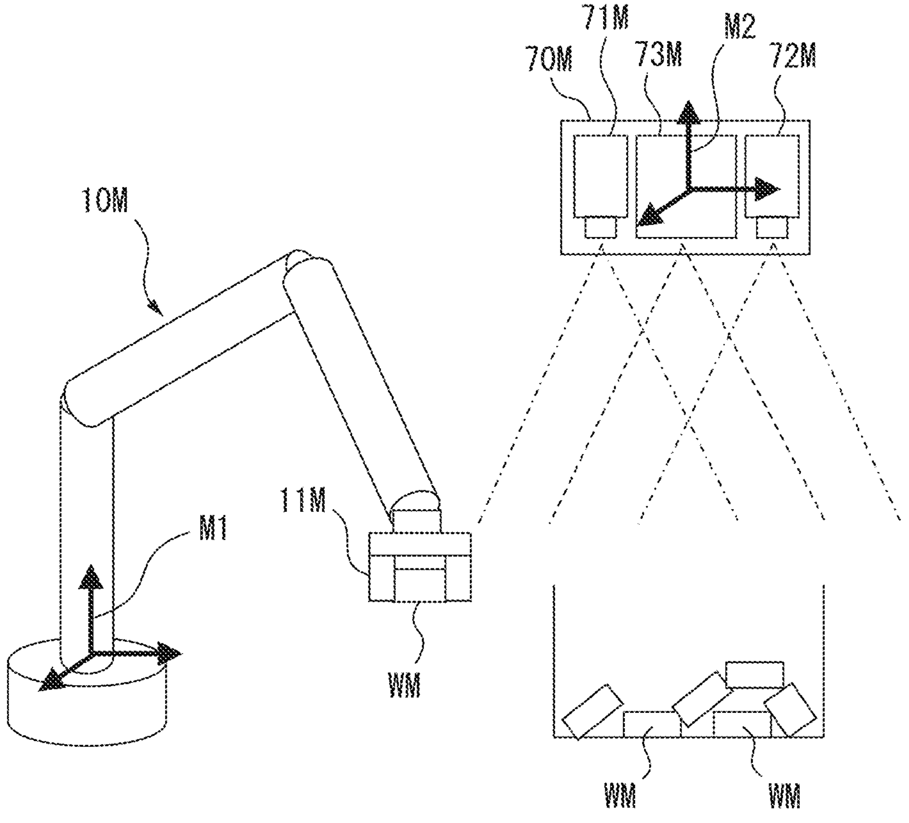
FIG. 14 is a diagram illustrating a state where a simulation operation of picking up the workpiece model by the robot model is executed by a simulation execution unit.

FIG. 14 illustrates a state where the simulation operation of picking up the workpiece model WM by the robot model 10M is executed by the simulation execution unit 135. Such an operation may be displayed on the display unit 33 of the robot simulation device 30.

In this way, according to the present embodiment, a simulation operation of work of a robot model is executed while a state of a workpiece loaded in bulk in a workspace is reproduced in a virtual space, and thus an operation program that can execute a more accurate picking-up operation can be efficiently created.

The present invention has been described above by using the typical embodiments, but it will be understood by those of ordinary skill in the art that changes, other various changes, omission, and addition may be made in each of the embodiments described above without departing from the scope of the present invention.

The functional block of the robot simulation device 30 illustrated in FIG. 3 may be achieved by executing software stored in a storage device by the processor 31 of the robot simulation device 30, or may be achieved by a configuration in which hardware such as an application specific integrated circuit (ASIC) is a main body.

The program executing the simulation operation in FIG. 4 in the embodiment described above can be recorded in various computer-readable recording media (for example, a ROM, an EEPROM, a semiconductor memory such as a flash memory, a magnetic recording medium, and an optical disk such as a CD-ROM and a DVD-ROM).

REFERENCE SIGNS LIST

10 Robot
10M Robot model
11 Hand
11M Hand model
20 Robot controller
21 Processor
22 Memory
23 Input/output interface
24 Operating unit
30 Robot simulation device
31 Processor
32 Memory
33 Display unit
34 Operating unit
35 Input/output interface
70 Visual sensor
70M Visual sensor model
71, 72 Camera
71M, 72M Camera model
73 Projector
73M Projector model
81 Container
81M Container model
100 Robot system
131 Virtual space creation unit
132 Model arrangement unit
133 Visual sensor model position setting unit
134 Workpiece model position calculation unit
135 Simulation execution unit

The invention claimed is:

1. A robot simulation device for simulating work performed on a workpiece by a robot in a robot system including the robot, a visual sensor, and the workpiece arranged in a workspace, the robot simulation device comprising:
a processor configured to
arrange a robot model of the robot, a visual sensor model of the visual sensor, and a workpiece model of the workpiece in a virtual space that three-dimensionally expresses the workspace,
calculate a position and a posture of the workpiece model with reference to the robot model or the visual sensor model in the virtual space by superimposing a shape feature of the workpiece model on three-dimensional position information about the workpiece with reference to the robot or the visual sensor, the three-dimensional position information about the workpiece being actually measured by the visual sensor in the workspace, and
execute a simulation operation of measuring the workpiece model by the visual sensor model and causing the robot model to perform work on the workpiece model, wherein
the processor is configured to
arrange, in the virtual space, the workpiece model in the calculated position and the calculated posture with reference to the robot model or the visual sensor model so that an actual arrangement of the workpiece in the workspace is reproduced in the virtual space, and
calculate the position and the posture of the workpiece model as a position and a posture of a workpiece model coordinate system defined on the workpiece model with respect to a robot model coordinate system defined on the robot model or a visual sensor model coordinate system defined on the visual sensor model.

2. The robot simulation device according to claim 1, wherein
the three-dimensional position information about the workpiece actually measured by the visual sensor in the workspace includes three-dimensional position information about all workpieces including the workpiece loaded in bulk in the workspace being actually measured by using the visual sensor.

3. The robot simulation device according to claim 2, wherein
the three-dimensional position information about the all workpieces is a set of three-dimensional points of the all workpieces actually measured by using the visual sensor.

4. The robot simulation device according to claim 1, wherein
the processor is configured to
set a position and a posture of the visual sensor model with reference to the robot model in the virtual space, based on a position and a posture of the visual sensor with reference to the robot in the workspace, and
arrange, in the virtual space, the visual sensor model in the set position and the set posture of the visual sensor model.

5. The robot simulation device according to claim 4, wherein
the position and the posture of the visual sensor with reference to the robot in the workspace are data included in calibration data acquired by performing calibration of the visual sensor in the workspace.

* * * * *